United States Patent [19]

de Vries, Jr. et al.

[11] 4,261,583

[45] Apr. 14, 1981

[54] UNITARY ROD GLAND ASSEMBLY

[76] Inventors: Donald S. de Vries, Jr., 106 Pearl Ave., Balboa Island, Calif. 92662; Jules M. Hock, 16056 Arvela Dr., Whittier, Calif. 90603

[21] Appl. No.: 101,459

[22] Filed: Dec. 10, 1979

[51] Int. Cl.³ ............................................. F16J 15/32
[52] U.S. Cl. ................................. 277/152; 277/181; 277/189
[58] Field of Search ............... 277/152, 153, 181, 185, 277/186, 189

[56] References Cited

U.S. PATENT DOCUMENTS

| | | | |
|---|---|---|---|
| 2,145,458 | 1/1939 | Penick et al. | 277/181 |
| 2,964,342 | 12/1960 | Mainprize | 277/181 |
| 3,106,405 | 10/1963 | Pringle | 277/189 |
| 4,126,320 | 11/1978 | Pendleton | 277/152 |
| 4,172,599 | 10/1979 | Forch | 277/153 |

*Primary Examiner*—Robert I. Smith
*Attorney, Agent, or Firm*—Philip M. Hinderstein

[57] ABSTRACT

A rod gland assembly comprising a rod gland core made from a rigid material and adapted to be positioned in a cylinder, between the cylinder bore and a piston rod, and a multiple function seal/wiper/piston cushion element molded from a flexible material on the rod gland core, the multiple function element including a rod seal, a bore seal, a piston cushion, and a wiper/scraper.

20 Claims, 9 Drawing Figures

UNITARY ROD GLAND ASSEMBLY

BACKGROUND OF THE INVENTION

1. Field of the Invention

The present invention relates to a unitary rod gland assembly and, more particularly, to a simple, lightweight, low-cost, unitary rod gland assembly.

2. Description of the Prior Art

In the fields of pneumatic and hydraulic cylinders, accumulators, actuators, regulators, valves, and the like, a common mechanical component is a rod gland assembly which is adapted to be positioned in a cylinder, between the cylinder bore and a piston rod. The rod gland assembly is a stationary member positioned at one end of the cylinder and includes a rod gland which is responsible for supporting multiple seal elements for performing multiple functions. Conventional rod glands are made either from aluminum, brass, steel, or cast iron.

Initially, since it is necessary to prevent metal-to-metal contact between the same materials, the rod glands and the piston rods are either made from dissimilar materials or bearings are positioned in grooves in the rod gland's inner surface, which bearings physically contact the piston rods to provide a bearing surface.

Since it is necessary to provide a seal between the outer surface of the rod gland and the cylinder bore, a groove is generally positioned in the rod gland's outer surface for receipt of O-rings or gaskets to pevent leakage of the fluid within the cylinder between the rod gland outer surface and the cylinder bore. Since it is also necessary to provide a dynamic seal between the inside surface of the rod gland and the piston rod, it is conventional to provide a groove in the inner surface of the rod gland, adjacent the internal side thereof, for receipt of a rod seal which prevents leakage of the fluid within the cylinder along the pistion rod.

It is also necessary to prevent contaminates from entering into the cylinder as the piston rod reciprocates through the rod gland. Therefore, it is common to provide an additional groove in the inside surface of the rod gland, adjacent the external side thereof, for receipt of a wiper/scraper which prevents the passage of contaminates along the piston rod into the cylinder as the piston rod moves into the cylinder.

It can therefore be seen that a conventional rod gland assembly consists of a large number of interconnected parts. A rod gland assembly requires multiple O-rings, gaskets, and/or seals made from rubber, plastic, leather, and the like. The separate rod gland and seal element assemblies are expensive due to the need to manufacture each part individually.

An additional major expense which results from manufacturing a rod gland this way stems from the requirement of holding very close tolerances in cutting the grooves in the gland's inner and outer surfaces so that the seals inserted therein perform properly. Furthermore, each seal element has two potential leakage paths. For example, the bore seal has leakage paths between the bore and the bore seal and between the bore seal and the rod gland.

Since there are multiple components in a conventional rod gland assembly, assembly time is also longer and this adds to the expense. Where the rod gland is manufactured from steel, aluminum, or brass, it is quite heavy. There is also the possibility of one of the seal elements becoming dislodged during assembly of the rod gland assembly into the cylinder. In spite of the above disadvantages, rod gland assemblies have conventionally been made in the manner described above.

SUMMARY OF THE INVENTION

According to the present invention, there is provided a novel rod gland assembly which solves these problems in a manner unknown heretofore. The present rod gland assembly is inexpensive to manufacture and requires no assembly time. The present rod gland assembly is light in weight and provides a long wear life. The present rod gland assembly is manufactured in two steps, resulting in a unitary construction in which all components needed for a cylinder rod gland, either for hydraulic or pneumatic applications, are formed as an integral member, substantially minimizing the problems of assembly and replacement.

With the present rod gland assembly, it is not necessary to hold close tolerances in forming the dimensions of the grooves, if any, in the rod gland core because the seals are made from a material which will conform to the dimensions and shape of the rod gland core. Furthermore, the present rod gland assembly is significantly more reliable than conventional rod gland assemblies because each seal element now has only one potential leakage path.

Briefly, the present rod gland assembly comprises a rod gland core which is preferably molded form a rigid thermoplastic material, but could also be made from aluminum, brass, bronze, cast iron, or steel. A multiple function element is molded from either a flexible thermoplastic material or an elastomeric material on the rod gland core in a single operation. The element includes a rod seal adapted to engage the piston rod, a bore seal adapted to engage the cylinder bore, a wiper/scraper adapted to engage the piston rod, and a piston cushion positioned in the path of the piston. The multiple function element is held in place on the rod gland core by a mechanical lock through a series of cross holes. Where the rod gland core is molded from a plastic material, longitudinal grooves can economically be formed in the core's inner surface to retain a suitable lubricant.

OBJECTS, FEATURES, AND ADVANTAGES

It is therefore an object of the present invention to solve the problems associated with multiple component rod gland assemblies. It is a feature of the present invention to solve these problems by the provision of a unitary rod gland assembly including all components needed for a cylinder rod gland for either hydraulic or pneumatic applications. An advantage to be derived is that the present rod gland assembly is light in weight. A further advantage is that the present rod gland assembly may be assembled and replaced easily. A still further advantage is that the present rod gland assembly is low in cost. Another advantage of the present rod gland assembly is that it may use high wear resistance materials which will provide a long wear life.

Still other objects, features, and attendant advantages of the present invention will become apparent to those skilled in the art from a reading of the following detailed description of the preferred embodiments constructed in accordance therewith, taken in conjunction with the accompanying drawings wherein like numberals designate like or corresponding parts in the several figures and wherein:

DESCRIPTION OF THE PREFERRED EMBODIMENTS

Figure 1:
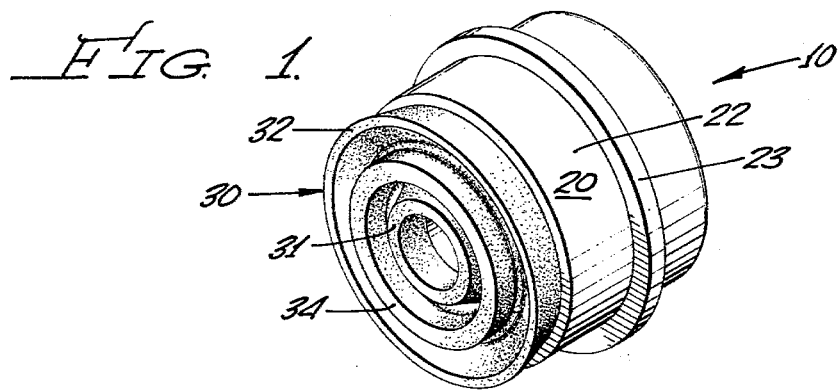
FIG. 1 is a perspective view of a rod gland assembly constructed in accordance with the teachings of the present invention.
Figure 2:
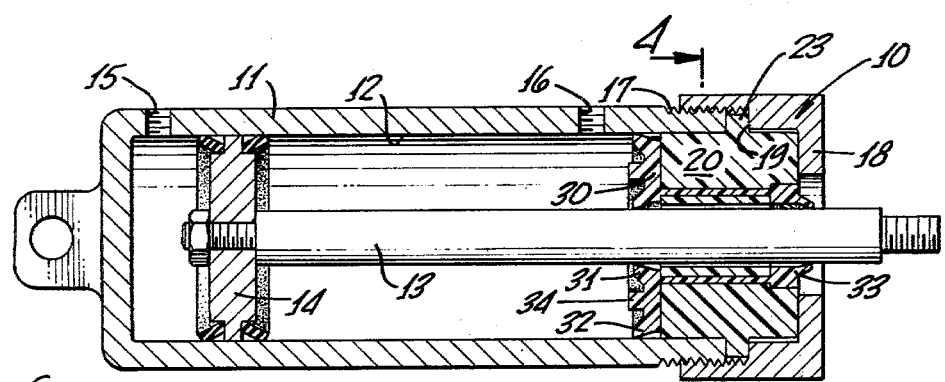
FIG. 2 is a longitudinal sectional view of the rod gland assembly of FIG. 1 shown installed in a typical hydraulic or pneumatic cylinder.

Referring now to the drawings and, more particularly, to FIGS. 1-4 thereof, there is shown a rod gland assembly, generally designated 10, constructed in accordance with the teachings of the present invention. Rod gland assembly 10 is suited for use in a pneumatic or hydraulic cylinder, such as a cylinder 11, but is widely useable in accumulators, actuators, regulators, valves and the like. By way of example, rod gland assembly 10 may be positioned in cylinder 11, between the cylinder bore 12 and a piston rod 13. Piston rod 13 may have one end thereof connected to a piston 14 which may be of the type described in our copending patent application Ser. No. 827,425, filed Aug. 24, 1977, and entitled Unitary Plastic Piston. The reciprocation of piston 14 within cylinder bore 12 is under control of a pair of inlet ports 15 and 16 positioned on opposite sides of piston 14, piston 14 being moved to the right or left depending upon whether fluid is pumped into port 15 or 16.

Piston rod 13 extends through rod gland assembly 10. Rod gland assembly 10 includes a rod gland core 20 which is a cylindrical member having inner and outer surfaces 21 and 22, respectively. The inside diameter of core 20 is approximately equal to the outside diameter of piston rod 13 whereas the outside diameter of core 20 is approximately equal to the diameter of cylinder bore 12.

In order to secure rod gland assembly 10 within cylinder bore 12, it may include a radially outwardly extending flange 23 made integral with the perimeter thereof. Flange 23 bears against the open end of cylinder 11. The outside surface at the open end of cylinder 11 is externally threaded, as shown at 17, for receipt of the threads of a gland nut 18. Gland nut 18 includes an internal shoulder 19 which bears up against flange 23. Accordingly, with rod gland core 20 positioned within the open end of cylinder 11, tightening of gland nut 18 onto threads 17 sandwiches flange 23 between shoulder 19 and cylinder 11 to lock core 20 in cylinder bore 12. This is one of many known ways of positioning a rod gland assembly within a cylinder.

According to the present invention, rod gland core 20 is preferably an injection molded part made from a rigid thermoplastic material. One suitable material is nylon which may or may not be fortified with other materials to enhance its strength, depending upon the potential application. For example, it is known to fortify nylon with glass fibers to provide rigidity and strength and silicone oil and molybdinum sulfide for internal lubrication to provide a certain degree of flexibility. Other suitable materials are polyphenylene sulfide, fortified polyphenylene sulfide, polycarbonate, fortified polycarbonate, acetal, fortified acetal, and fortified polypropylene. Core 20 may be molded from one of these materials in a conventional manner known to those skilled in the art. Where core 20 is made from a plastic material, inner surface 21 thereof provides a suitable bearing surface for rod 13, eliminating the necessity of including an additional bearing.

Alternatively, rod gland core 20 may be made from any of the metals used heretofore for construction of rod glands. Thus, rod gland core 20 may be machined from aluminum, brass, bronze, cast iron, or steel.

According to the present invention, after rod gland core 20 is formed, either by molding or machining, it is placed into a mold and a multiple function element, generally designated 30, is molded directly thereonto. Element 30 is preferably molded from a flexible thermoplastic material so that poritons thereof can function efficiently as seal elements. Suitable materials for element 30 are polyurethane, a polyester thermoplastic elastomer, or thermoplastic rubber. Alternatively, element 30 may be molded from a thermosetting material (rubber), such as nitrile, viton, neoprene, ethylene propylene, silicone, and fluorinated silicone. Molding may be accomplished as described in our beforementioned copending patent application Ser. No. 827,425 or in other ways known to those skilled in the art.

According to the preferred embodiment, element 30 includes a rod seal section 31 adapted to engage piston rod 13, a bore seal section 32 adapted to engage cylinder bore 12, a wiper/scraper section 33 adapted to engage piston rod 13, and a piston cushion section 34 adapted to be positioned in the path of piston 14.

Figure 3:
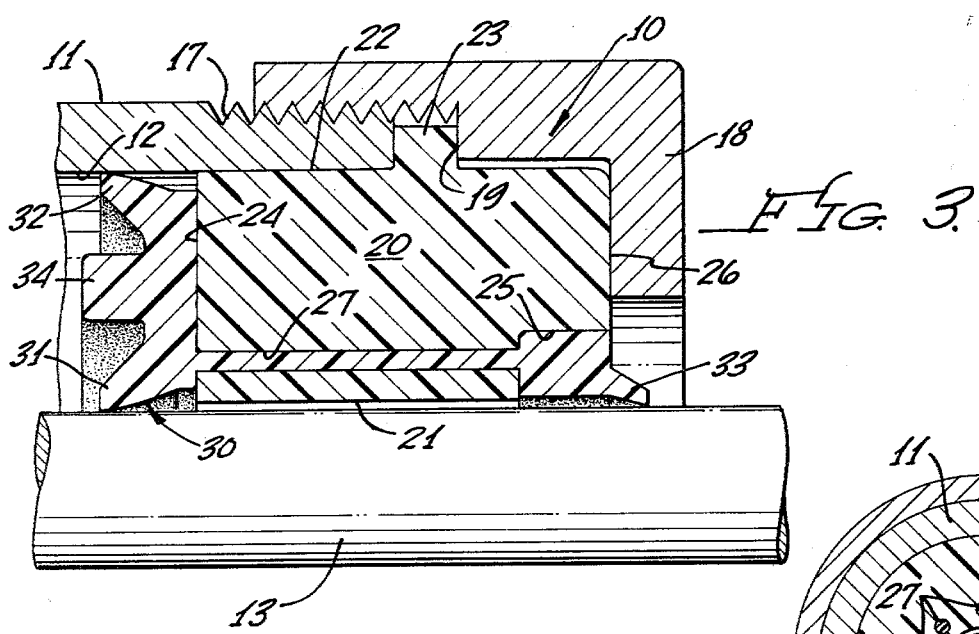
FIG. 3 is an enlarged, partial, sectional view of the rod gland assembly of FIGS. 1 and 2 showing the details thereof.

According to the embodiment of the invention shown in FIG. 3, rod seal section 31, bore seal section 32, and piston cushion section 34 are formed as a single integral unit on the internal side surface 24 of core 20 whereas wiper/scraper section 33 is formed as a separate unit in an annular recess 25 at the intersection between inner surface 21 of core 20 and the external side surface 26 thereof. According to the embodiment of FIG. 3, all of seal sections 31, 32 and 33 have the shape of conventional lip seals, lip seal 32 bearing against bore 12 and lip seals 31 and 33 bearing against piston rod 13.

By molding a multiple function element 30 on core 20, in a single molding operation, it is not necessary to hold close tolerances for areas such as recess 25 in core 20 because the material from which element 30 is formed will readily conform to the dimensions and surface shapes of core 20. Furthermore, it now becomes convenient to incorporate piston cushion section 34 in element 30. Section 34 prevents a rigid piston, such as piston 14, from striking a rigid gland, such as rod gland core 20, causing shocks or shock loading in cylinder 11. In many applications, this shock loading can be destructive to the overall assembly the cylinder is used in. With the present invention, a piston cushion section may be added without additional cost.

Means must be provided for holding element 30 on rod gland core 20 during use. This is preferably achieved by a mechanical lock. That is, core 20 has a plurality of holes 27 extending axially therethrough which connect recess 25 with side surface 24 of core 20.

Figure 4:
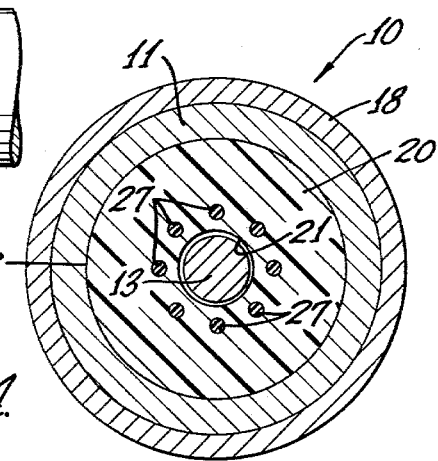
FIG. 4 is a sectional view taken along the line 4—4 in FIG. 2.

Holes 27 provide fluid communication between the opposite surfaces of core 20. Thus, as the molten material from which element 30 is formed is injected into the mold, such material flows through holes 27. By spacing a series of holes 27 around the inner surface 21 of core 20, as shown in FIG. 4, an effective mechanical interlock between the sections of element 30 and core 20 is formed to prevent separation of the sections of element 30 and core 20 in use.

It can therefore be seen that the essence of the present invention is the molding of a multiple function seal/wiper/cushion element on a rod gland core to provide a unitary rod gland assembly. The configurations of the individual sections of element 30 shown in FIG. 3 are merely examples of the possible shapes permissible. Other shapes are known to those skilled in the art, as explained more fully hereinafter.

Figure 5:
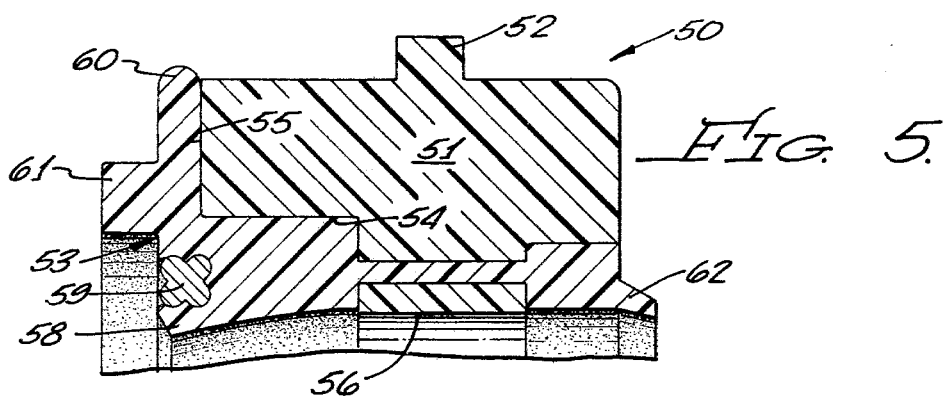
FIGS. 5-8 are sectional views similar to FIG. 3 showing alternate embodiments of the present invention.

Referring now to FIG. 5, there is shown an alternate embodiment of rod gland assembly, generally designated 50. Rod gland assembly 50 is virtually identical to rod gland assembly 10 and includes a rod gland core 51, having an optional positioning flange 52, and a multiple function element 53. Rod gland core 51 is identical to rod gland core 20 except for the provision of an annular recess 54 at the intersection between internal side surface 55 and inner surface 56. This provides a space for a rod seal section 58 having a configuration, known to those skilled in the art, of the type which receives a quad ring expander 59 for increasing the sealing force of rod seal section 58. In addition, the embodiment of FIG. 5 shows that the bore seal section 60 need not be a lip seal, but may be a seal having a configuration more similar to an O-ring seal. Other than these changes, the element 53 of rod gland assembly 50 includes a piston cushion section 61 and a wiper/scraper section 62 having the configurations described previously with regard to the embodiment of FIGS. 1-4, which are interconnected in the manner described previously.

Figure 6:
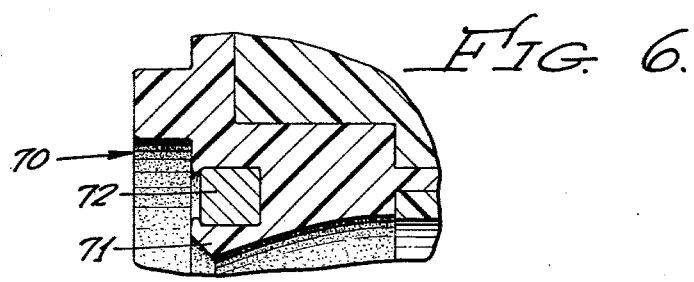
Figure 7:
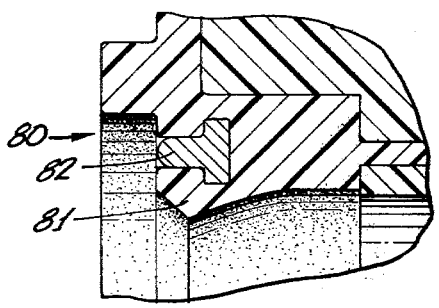
Figure 8:
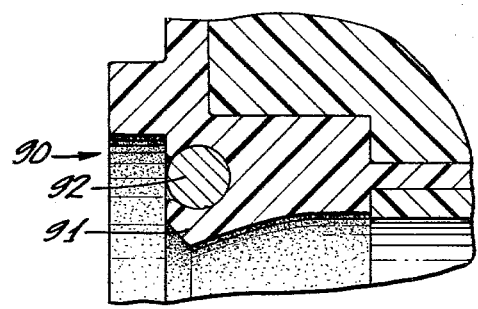

Referring now to FIGS. 6, 7, and 8, there are shown portions of alternative embodiments of rod gland assemblies, generally designated 70, 80, and 90. Each of rod gland assemblies 70, 80, and 90 is identical to rod gland assembly 50 except that the rod seal sections 71, 81, and 91, respectively, thereof differ from rod seal section 58 of rod gland assembly 50 so as to receive different types of seal expanders. Thus, rod seal section 71 of rod gland assembly 70 is adapted to receive a square expander 72, rod seal section 81 of rod gland assembly 80 is adapted to receive a T-expander 82, and rod seal section 91 of rod gland assembly 90 is adapted to receive an O-ring expander 92. The embodiments of FIGS. 6-8 serve to show the flexibility of different seal configurations which may be used following the teachings of the present invention.

Figure 9:
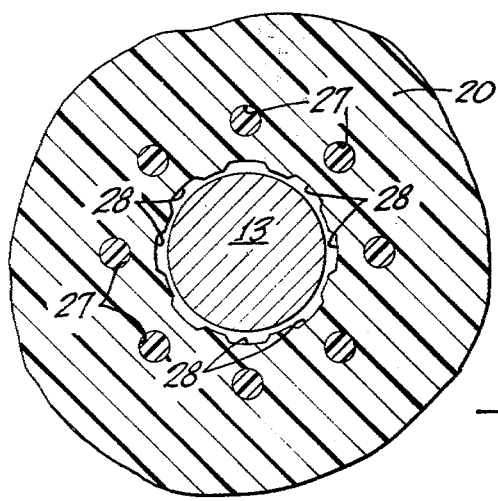
FIG. 9 is a sectional view taken along the line 4—4 in FIG. 2 and showing the use of grooves in the rod gland core to retain a lubricant.

Referring now to FIG. 9, there is shown another advantage achievable with the present invention. Specifically, where rod gland core 20 is molded from a rigid thermoplastic material, it is possible to form a series of axial grooves 28 in inner surface 21 thereof during the molding process. This permits a suitable lubricant to be positioned in grooves 28, between inner surface 21 of core 20 and the outer surface of piston rod 13, which lubricant will be retained between rod seal section 31 and wiper/scraper section 33 of element 30. Providing such grooves on the inside surface of a rod gland core has been impractical heretofore because of the machining involved using metal materials for core 20. Using plastic materials, the plastic not only provides a high wear resistant bearing, but also makes convenient the addition of grooves 28 and their lubricant storing capability.

It can therefore be seen that according to the present invention, there is provided a novel rod gland assembly which solves the problems associated with multiple component rod gland assemblies. The present rod gland assembly is inexpensive to manufacture in that it is generally not necessary to hold close tolerances and because the entire assembly is formed in two operations. Because of this later feature, the present assembly requires no assembly time. When made from plastic materials, the present rod gland assembly is light in weight, typically being only 14% of the weight of at typical steel assembly and only 35% of the weight of a typical aluminum assembly.

The present rod gland assembly is manufactured in two steps, resulting in a unitary construction in which all components needed for a cylinder rod gland, either for hydraulic or pneumatic applications, are formed as an integral member, substantially minimizing the problems of assembly and replacement. The present rod gland assembly is also significantly more reliable than conventional rod gland assemblies. That is, the present design allows the material of element 30 to flow and conform to the surfaces of rod gland core 20 during molding, leaving only a single potential leakage path between each seal/wiper section and its associated bore or rod.

While the invention has been described with respect to the preferred physical embodiments constructed in accordance therewith, it will be apparent to those skilled in the art that various modifications and improvements may be made without departing from the scope and spirit of the invention. Accordingly, it is to be understood that the invention is not to be limited by the specific illustrative embodiments, but only by the scoope of the appended claims.

We claim:

1. A rod gland assembly comprising:
   a rod gland core made from a rigid material and adapted to be positioned in a cylinder, between the cylinder bore and a piston rod, said rod gland core being a cylindrical member having a plurality of passageways extending axially therethrough; and
   a multiple function, one-piece element molded on said rod gland core in a single operation, said element including:
   a rod seal adapted to engage said piston rod;
   a bore seal adapted to engage said cylinder bore, said rod seal and said bore seal being positioned adjacent one side of said rod gland core; and
   a wiper/scraper adapted to engage said piston rod, said wiper/scraper being positioned adjacent the other side of said rod gland core, the material of said element extending through said passageway in said core to connect the material on opposite sides thereof to form a mechanical lock between said rod gland core and said element.

2. A rod gland assembly according to claim 1, wherein said element further includes:
   a piston cushion positioned on said one side of said rod gland core.

3. A rod gland assembly according to claim 1, or 3, wherein said rod gland core is made from a metal material selected from the group consisting of aluminum, brass, bronze, cast iron, and steel.

4. A rod gland assembly according to claim 1, or 3, wherein said rod gland core is molded from a rigid thermoplastic material.

5. A rod gland assembly according to claim 4, wherein said rigid thermoplastic material is selected from the group consisting of nylon, nylon fortified with other materials to enhance its strength, polyphenylene sulfide, polyphenylene sulfide fortified with other materials to enhance its strength, polycarbonate, polycarbonate fortified with other materials to enhance its strength, acetal, acetal fortified with other materials to enhance its strength, and polypropylene fortified with other materials to enhance its strength.

6. A rod gland assembly according to claim 5, wherein said other materials include glass fibers, silicone oil, and molybdinum disulfide.

7. A rod gland assembly according to claim 4, wherein said rod gland core has a series of axial grooves in the inner surface thereof.

8. A rod gland assembly according to claim 1, or 2, wherein said element is molded from a flexible thermoplastic material.

9. A rod gland assembly according to claim 8, wherein said flexible thermoplastic material is selected from the group consisting of polyurethane, a polyester thermoplastic elastomer, and thermoplastic rubber.

10. A rod gland assembly according to claim 1, or 2, wherein said element is molded from a thermosetting material.

11. A rod gland assembly according to claim 10, wherein said thermosetting material is selected from the group consisting of nitride, viton, neoprene, ethylene propylene, silicone, and fluorinated silicone.

12. A rod gland assembly according to claim 1, or 2, wherein said wiper/scraper is a lip seal.

13. A rod gland assembly according to claim 1, or 2, wherein said bore seal is a lip seal.

14. A rod gland assembly according to claim 1, or 2, wherein said rod seal is a lip seal.

15. A rod gland assembly according to claim 1, or 2, wherein said rod seal is of the type which receives an expander for increasing the sealing force thereof against said piston rod.

16. A rod gland assembly according to claim 15, wherein said rod seal is of the type wich receives a quad ring expander.

17. A rod gland assembly according to claim 15, wherein said rod seal is of the type which receives a square expander.

18. A rod gland assembly according to claim 15, wherein said rod seal is of the type which receives a T-expander.

19. A rod gland assembly according to claim 15, wherein said rod seal is of the type which receives an O-ring expander.

20. A unitary rod gland assembly comprising:
a core molded from a rigid thermoplastic material, said core consisting of a cylindrical member having a plurality of holes extending axially therethrough; and
a one-piece element made from a flexible thermoplastic material molded on said core, on at least opposite sides thereof, the material of said element extending through said holes in said core to connect the material on said opposite sides to form a mechanical bond between said element and said core,
there being no adhesion or chemical bond between said core and said element, said mechanical bond being the only means for holding said element on said core.

* * * * *